(12) United States Patent
Ramanathan et al.

(10) Patent No.: US 8,051,012 B2
(45) Date of Patent: Nov. 1, 2011

(54) SYSTEM AND METHOD FOR DISCOUNTED PRINTING

(75) Inventors: Krishnan Ramanathan, Karnataka (IN); Ajay Gupta, Karnataka (IN); Somnath Banerjee, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 12/177,155

(22) Filed: Jul. 22, 2008

(65) Prior Publication Data

US 2009/0307029 A1 Dec. 10, 2009

(30) Foreign Application Priority Data

Jun. 9, 2008 (IN) .......................... 1405/CHE/2008

(51) Int. Cl.
*G06Q 20/00* (2006.01)
(52) U.S. Cl. ........................................ 705/78; 283/78
(58) Field of Classification Search ........................ None
See application file for complete search history.

(56) References Cited

U.S. PATENT DOCUMENTS

| | | | | |
|---|---|---|---|---|
| 5,005,200 A * | 4/1991 | Fischer | ......................... | 380/30 |
| 2001/0052997 A1* | 12/2001 | Satake et al. | ................ | 358/1.15 |
| 2005/0066164 A1* | 3/2005 | Simon | ......................... | 713/156 |
| 2006/0028674 A1* | 2/2006 | Lapstun et al. | ............. | 358/1.15 |
| 2006/0161491 A1* | 7/2006 | Franzone | ...................... | 705/35 |

* cited by examiner

*Primary Examiner* — Jamie Kucab

(57) ABSTRACT

A system and method for method for implementing a discounted printing is disclosed. In one embodiment, a method for implementing discounted printing includes creating a sponsored document including a digital signature using a cryptographic protocol provided in an application by an enterprise, sending the sponsored document including the digital signature to a client computing system including a sponsored printer for printing by the enterprise, dynamically verifying the digital signature by a trusted service provider upon the enterprise sending the sponsored document to the sponsored printer, and printing the sponsored document by the sponsored printer upon a successful verification of the digital signature. The method may also include crediting an end user associated with the sponsored printer by an amount that substantially subsidizes cost associated with the printing of the sponsored document.

17 Claims, 5 Drawing Sheets

SYSTEM AND METHOD FOR DISCOUNTED PRINTING

RELATED APPLICATIONS

Benefit is claimed under 35 U.S.C. 119(a)-(d) to Foreign application Ser No. 1405/CHE/2008 entitled "SYSTEM AND METHOD FOR DISCOUNTED PRINTING" by Hewlett-Packard Development Company, L.P., filed on 9th Jun., 2008, which is herein incorporated in its entirety by reference for all purposes.

BACKGROUND

Currently, with the Internet, customers have come to expect up on-demand, up-to-date and relevant information. Enterprises that have traditionally valued print media for marketing communications are finding it a challenge to provide this kind of information, using traditional centralized printing and physical distribution techniques.

Marketing communication tools, such as brochures, direct mail, coupons, and inserts and customer relationship management components, such as orders, invoices, complaints and so on, are most significant drivers of business printing today. Typically, large percentage of trillion or so pages, printed per year by enterprises is used for marketing alone. Further, CRM and advertising industry account for a large percentage of the trillion or so pages printed per year. This makes print-based advertising significantly larger than online advertising, as print media can have certain inherent advantages such as retainability, ease-of-use, visual appearance, extensible display surface and so on, that are generally attractive for marketing.

Despite the above advantages of the print media, enterprises are increasingly investing in Web-based communication, often at the expense of printing. Some of the reasons for this shift are the ability of Web marketing to target and personalize messages, provide larger amount of content at near zero incremental cost, and the speed at which content can be updated and delivered. Currently, print based communication methods that involve centralized printing and physical distribution, such as direct mail do not provide enough speed, flexibility to modify content, personalization, traceability, and most significantly targetability. Further, online Web-based advertisements provide ability to generate actionable transactions and analytics. Furthermore, online Web-based advertisements provide high traceability and clickthrough measurability. Moreover, the online Web-based advertisements provide ability to change content at a short notice. Therefore, enterprises are investing heavily in online advertisements at the expense of other media of communications.

However, Web based marketing and advertising is unable to address the need of enterprises which value printed collaterals for effectiveness. Further, the current centralized printing and physical distribution, such as direct mail are push based systems and often are ill-directed and wasted. Furthermore, current techniques do not provide a means by which a consumer, in developing or emerging markets, can print information when he/she needs it without incurring printing cost, which can be prohibitive. This can significantly impact print based marketing and/or communication in these market segments.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A system and method for implementing a discounted printing is disclosed. In the following description, for purposes of explanation, numerous specific details are set forth in order to provide a thorough understanding of the various embodiments. It will be evident, however, to one skilled in the art that the various embodiments may be practiced without these specific details.

The term "sponsored document" refers to a document that, when printed on a sponsored printer, causes some or whole of cost associated with the printing of the document to be reimbursed to a consumer. In these embodiments, the reimbursement cost can exceed the cost of printing the sponsored document. The term "end user" refers to an individual user, an enterprise, a kiosk, a business entity and so on. The terms "end user", "consumer" and "customer" are used interchangeably throughout the document.

Figure 1:
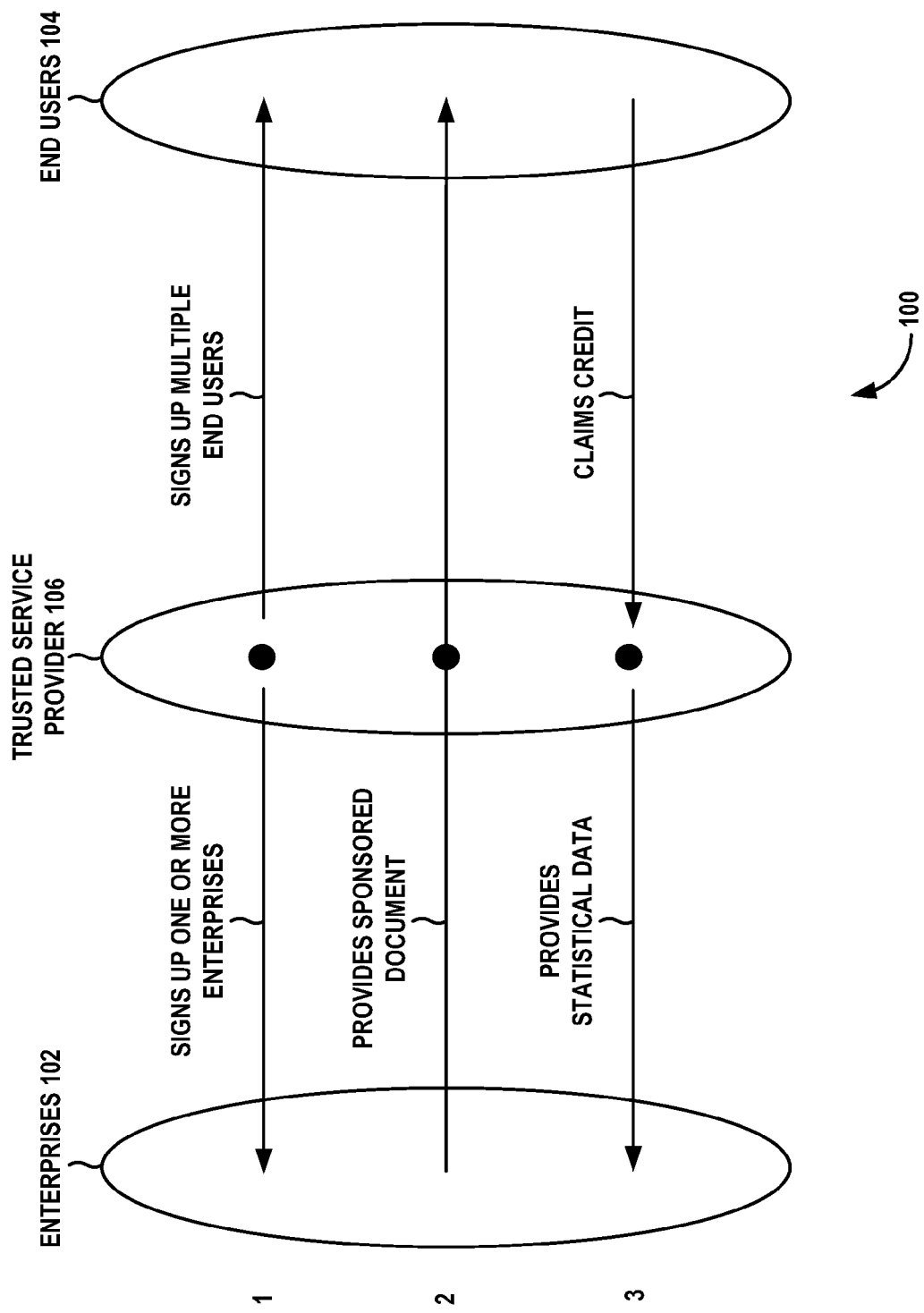
FIG. 1 illustrates various parties and elements and their interconnections to implement a discounted printing, according to one embodiment.

FIG. 1 illustrates various parties and elements and their interconnections to implement a discounted printing, according to one embodiment. Particularly, FIG. 1 illustrates interconnections between enterprises 102, end users 104 and a trusted service provider 106.

Further, FIG. 1 shows a method of sponsored printing service that allows the enterprises 102 to distribute targeted on-demand print content to the end users 104 via the trusted service provider 106. The enterprises 102 may include entities (e.g., customer relationship management (CRM), advertising industry, individual sponsors, etc.) that want to distribute printed collaterals and brochures from the web. The end users 104 may be individual users, enterprises, kiosks, business entities, etc., desiring to print such collaterals from the web. The trusted service provider 106 enables discounted printing between the enterprises 102 and the end users 104 such that a centralized printing with preferred media content is enabled. For example, the trusted service provider 106 may provide end-to-end infrastructure and service needed for the discounted printing.

In operation, the trusted service provider 106 signs up one or more enterprises 102 and provides tools to create sponsored documents (e.g., brochures, direct mail, coupons, inserts, orders, invoices, complaints, etc.) for the end users 104, as a first step of the discounted printing. The trusted service provider 106 also signs up multiple end users 104 who are interested in availing the discounted printing. In one exemplary implementation, the trusted service provider 106 may manufacture and distribute sponsored printer(s) (e.g., a printer coupled to a client computing system associated with the end user 104 which is used for discounted printing and capable of verifying sponsorship using cryptographic mechanisms) to the end users 104 for implementing the discounted printing.

Further, the trusted service provider 106 may set up a centralized sponsored-print-service compute infrastructure for recording end user and enterprise information, logging transactions, and generating analytics information. It is appreciated that, the end users 104 and the enterprises 102 are connected through the internet and accessible to the centralized sponsored-print-service compute infrastructure at the time of printing.

As a second step of the discounted printing, the sponsored document is created by the enterprises 102 and provided to the end users 104. In one embodiment, the enterprises 102 may embed digital signatures in documents that are to be printed by the end users 104, thus creating the sponsored documents. It is appreciated that, the sponsored documents, when printed on the sponsored printer, enable reimbursement of cost associated with the printing of the sponsored document to the end user 104.

For example, the above-mentioned technique of discounted printing distributes contents like enterprise generated content (e.g., marketing collateral or CRM material that is pre-authorized for sponsored printing and distributed from an enterprise portal (e.g., the enterprise portal 202 of FIG. 2) or as an email attachment), and consumer generated content (e.g., maps or personal emails, where sponsored printing authorization takes place on demand (i.e., a pull based method)). It is appreciated that various other contents known in the art may also be distributed using the discounted printing.

Further, the trusted service provider 106 records statistical data (e.g., print analytics) and sends it to the enterprises 102, as a third step in the discounted printing illustrated in FIG. 1. For example, the statistical data can provide an additional source of value for the enterprises 102 and enable the trusted service provider 106 to know their end users 104 (e.g., customers). It can be also seen from FIG. 1 that the end users 104 can claim credit to the enterprises 102 by an amount that substantially subsidizes cost associated with the printing of the sponsored document. In some embodiments, reimbursed cost may exceed actual cost of printing the sponsored document. In one embodiment, the end users 104 are credited based on the stored credit information associated with the sponsored printing.

It is appreciated that, at regular intervals (e.g., after completion of ink in the printer cartridge of the sponsored printer), the trusted service provider 106 enables print cost reimbursement to the end users 104 and receive (e.g., monthly) service charges from the enterprises 102 for delivering their print content (e.g., in the form of sponsored documents) and for providing the statistical data. Further, the implementation of discounted printing is explained in greater detail with respect to FIG. 2.

Figure 2:
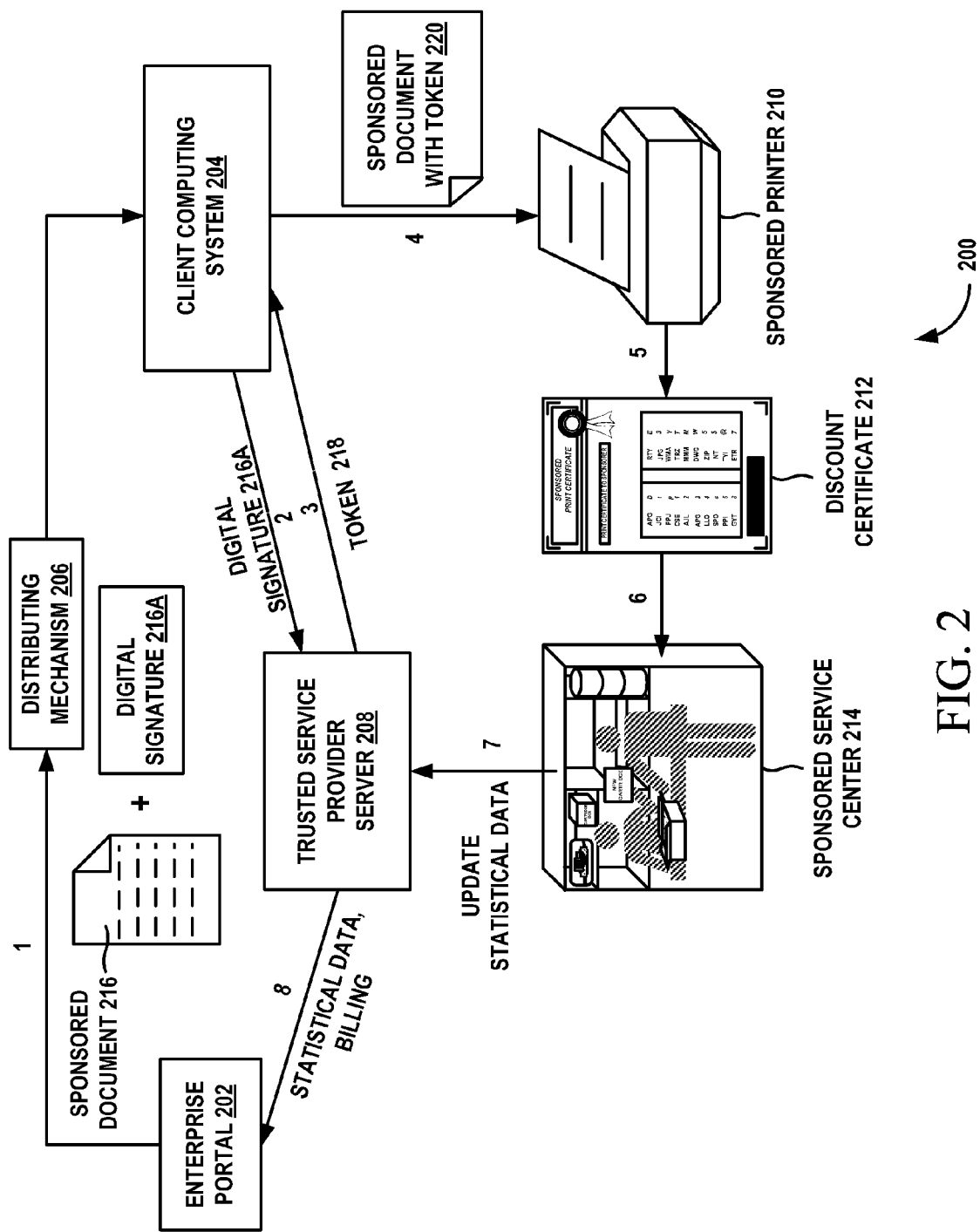
FIG. 2 illustrates a schematic diagram including major components and their interconnections for implementing the discounted printing, such as those shown in FIG. 1, according to one embodiment.

FIG. 2 illustrates a schematic diagram 200 including major components and their interconnections for implementing the discounted printing, such as those shown in FIG. 1, according to one embodiment. Particularly, FIG. 2 illustrates an enterprise portal 202 communicating with a client computing system 204 via a distribution mechanism 206. Further, shown in FIG. 2 is a trusted service provider server 208 coupled to the enterprise portal 202 and the client computing system 204, a sponsored printer 210 including a sponsored module communicatively coupled to the client computing system 204, a discount certificate 212 and a sponsored service center 214 associated with the discounted printing.

In some embodiments, the enterprise portal 202 is associated with the one or more enterprises 102 and the client computing system 204 is associated with the end user 104. In the example embodiment illustrated in FIG. 2, the enterprise portal 202 sends a sponsored document 216 including a digital signature 216A to the client computing system 204 via the distributing mechanism 206. For example, the distributing mechanism 206 may include an email, a social networking portal, a web portal, etc. In one exemplary implementation, the enterprise portal 202 may send the sponsored document 216 in a portable document format (PDF), a post script format, a printer control language (PCL) format or any other file format compatible with the sponsored printer 210.

In some embodiments, the enterprise portal 202 creates the sponsored document 216 including the digital signature 216A. There may be many sources from where contents of the sponsored document 216 can be obtained. For example, photos in web photo account of an individual may be sponsored by the individual for printing (e.g., by his/her relatives and/or friends who want to print the photos). Further, the enterprises 102 can sponsor printing of reviews of certain products in websites (e.g., if the review is favorable to the enterprises 102). In these embodiments, the sponsored document 216 is created using a cryptographic protocol provided in an application residing in the enterprise portal 202. For example, the cryptographic protocol is an abstract security protocol that applies cryptographic methods to embed the digital signature 216A in the sponsored document 216. It is appreciated that the application including the cryptographic protocol is provided by the trusted service provider 106.

In some embodiments, the sponsored document 216 including the digital signature 216A is created by creating a hash of the sponsored document 216 which includes a header and encrypting the hash of the sponsored document 216 using a public key provided by the trusted service provider 106. For example, the public key may be a key of an encryption key pair used to encrypt and decrypt the digital signature 216A in the sponsored document 216. In one exemplary implementation, the header of the encrypted hashed sponsored document 216 includes metadata that contains enterprise sponsorship related information such as, number of pages that can be printed by the end user 104, geographical areas where the sponsored document 216 can be printed, period of validity for printing, a printer identification number, etc.

It can be seen from FIG. 2 that the client computing system 204 includes a computer (e.g., with a sponsored printing software) that is communicatively coupled to the sponsored printer 210 including the sponsored module. In one embodiment, the sponsored printer 210 includes a printer cartridge in which the sponsored module resides. It is appreciated that the sponsored printer 210, provided by the trusted service provider 106, is capable of verifying sponsorship using cryptographic mechanisms. In one exemplary implementation, the sponsored printer 210 is configured to print only sponsored document(s) 216 from the authorized enterprise(s) 102. One can envision that, the sponsored printer 210 can also be configured to print the sponsored documents and/or non-sponsored documents.

In operation, when the sponsored document 216 including the digital signature 216A is sent to the client computing system 204 by the enterprise portal 202, the encrypted hashed sponsored document 216 including the digital signature 216A is sent to the trusted service provider server 208 for verification. The trusted service provider server 208 decrypts the encrypted hashed sponsored document 216 using the public key. In one exemplary implementation, upon successful decryption of the encrypted hashed sponsored document 216, the trusted service provider server 208 sends a token 218 to the client computing system 204. In some embodiments, sponsored printing software (including a document plugin) on the client computing system 204 procures the token 218 from the trusted service provider server 208 using a security protocol.

In some embodiments, the token 218 includes a printer identification number (e.g., which is used by the sponsored printer 210 for verification) associated with the sponsored printer 210. In these embodiments, the token 218 may include other enterprise sponsorship related information such as period of validity of sponsorship, number of pages that can be printed by the end user 104, etc. For example, the information may be included in the header of the sponsored document 216. In one exemplary implementation, the trusted service provider 106 stores end user information of the end user 104 associated with the client computing system 204 in the trusted service provider server 208 upon a successful verification of the digital signature 216A (i.e., upon successful decryption of the sponsored document 216) associated with the sponsored document 216.

Further, as shown in FIG. 2, sponsored document with the token 220 is sent to the sponsored printer 210 by the client computing system 204 using the sponsored printing software. In one exemplary implementation, the sponsored printer 210 authenticates the token 218 and prints the sponsored document 216 upon a successful verification of the token 218 including the printer identification number. In one embodiment, the sponsored module residing in the printer cartridge of the sponsored printer 210 stores credit information associated with the printing of the sponsored document 216. In this embodiment, an audit trail of crediting the end user 104 is created in the sponsored printer 210. In one exemplary implementation, the audit trail is subsequently used for crediting the end user.

Further, FIG. 2 illustrates the discount certificate 212 including discount details, which is presented to the sponsored service center 214 for discount redemption by the end user 104. It can be noted that, reimbursement cost can exceed the actual cost of printing the sponsored document 216. In one embodiment, the end user 104 associated with the sponsored printer 210 can claim credit, upon completion of ink in the printer cartridge by returning the printer cartridge to the sponsored service center 214. In this embodiment, the sponsored service center 214, shown in FIG. 2, substantially discounts cost of the printer cartridge while replenishing with a new cartridge by verifying the credit information stored in the sponsored module residing in the printer cartridge. One skilled in the art can envision that the end user 104 can be credited by the enterprise 102, using various other methods known in the art.

Further, it is appreciated that the sponsored service center 214 computes the statistical data using the stored end user information and print analytics, and updates the trusted service provider 106 according to the example embodiment illustrated in FIG. 2. Finally, the statistical data and billing details, associated with the discounted printing, are sent to the one or more enterprises 102 associated with the enterprise portal 202 by the trusted service provider server 208.

Figure 3:
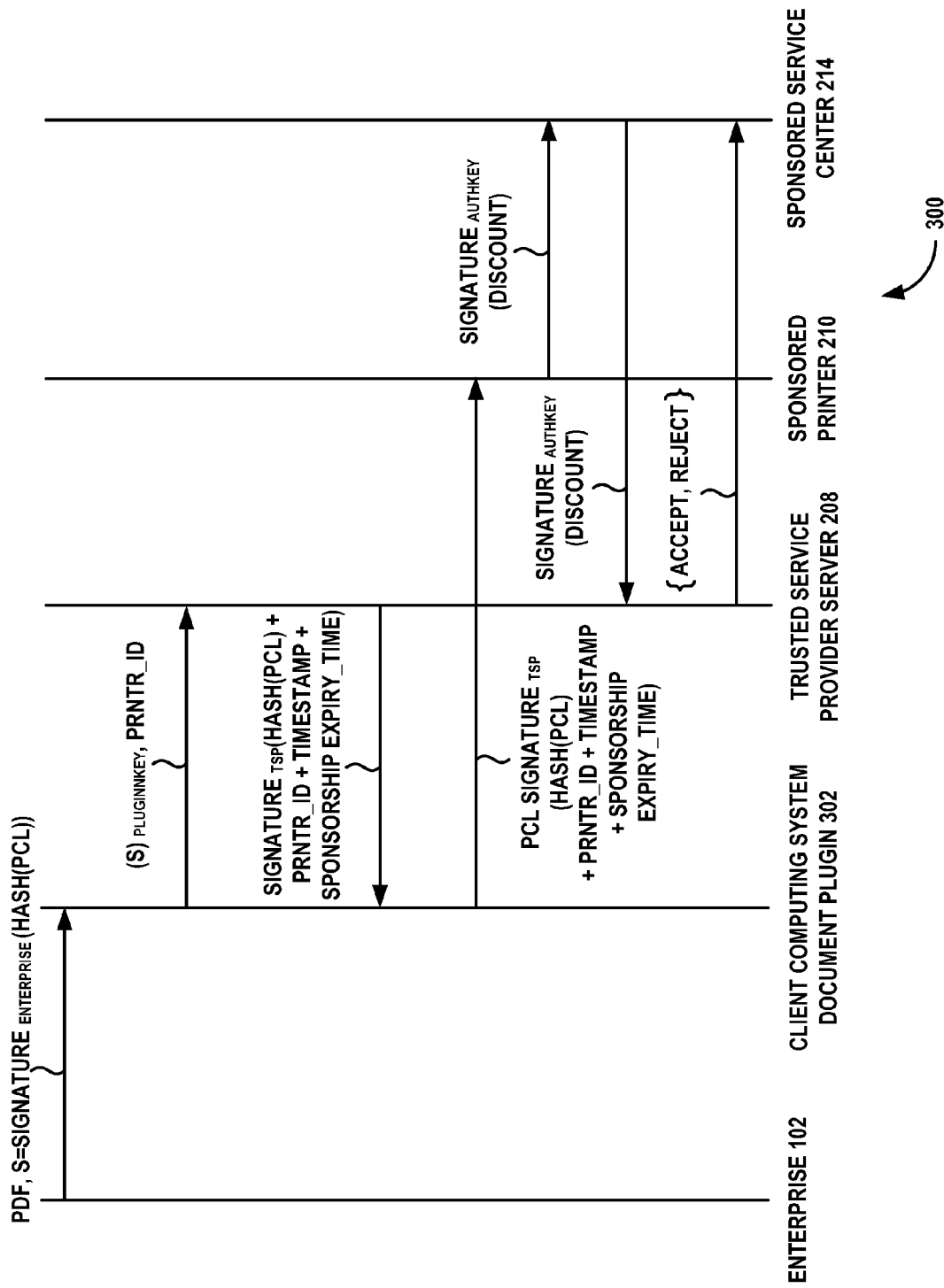
FIG. 3 illustrates a schematic diagram for implementing a security protocol for the discounted printing, such as those shown in FIGS. 1 and 2, according to one embodiment.

FIG. 3 illustrates a schematic diagram 300 for implementing a security protocol for the discounted printing, such as those shown in FIGS. 1 and 2, according to one embodiment. In some embodiments, the security protocol is designed to implement the discounted printing in a trustworthy manner to avoid attacks (e.g., unauthorized sponsorship, printer impersonation, low quality print, false plugin, false signature, etc.) on the sponsored printing. Further, the security protocol described herein provides capability to revoke permission extended to unauthorized enterprises and/or end users from future participation.

As illustrated, a cryptographic notation of a document (e.g., a PDF document) is created by an authorized signatory (e.g., chief executive officer (CEO) of the enterprise 102). For example, the enterprise 102 computes a digital signature 216A of printer control language (PCL) image of the PDF document and embeds the digital signature 216A into the PDF document meta-data section.

In the example embodiment illustrated in FIG. 3, the created document including the digital signature 216A (PDF, S=Signature$_{enterprise}$ (Hash (PCL)), referred herein as a sponsored document 216 is sent to the client computing system 204 by the enterprise 102. A client computing system document plugin 302 on the client computing system 204 receives the sponsored document 216 with the digital signature 216A. Further, the client computing system document plugin 302 sends a printer identification number (prntr_id) and the digital signature (S$_{pluginkey}$) 216A to the trusted service provider server 208 for verification of the digital signature 216A in the sponsored document 216. Upon a successful verification of the digital signature 216A by the trusted service provider server 208, the trusted service provider server 208 sends a token 218 to the client computing system 204.

For example, the token 218 includes a printer identification number, timestamp, sponsorship expiry time, etc. (Signature$_{TSP}$ (Hash (PCL)+prntr_id+timestamp+sponsorship expiry_time). In some embodiments, the trusted service provider server 208 stores the end user information (e.g., number of pages that can be printed by the end user 104, a printer identification number, period of validity of printing, etc.) and sends the token 218 to the client computing system document plugin 302. In one embodiment, the client computing system document plugin 302 can make print decisions based on the end user information stored on the client computing system 204 or on the trusted service provider server 208.

Further, the client computing system 204 sends the sponsored document 216 with the token 218 (PCL Signature$_{TSP}$ (Hash (PCL)+prntr_id+timestamp+sponsorship expiry_time) to the sponsored printer 210 for printing. In some embodiments, the sponsored printer 210 authenticates the token 218, prints the sponsored document 216 and stores credit information. Each time the sponsored printer 210 acquires a sponsored document 216 for printing, the credit information (Signature$_{AuthKey}$(Discount)) associated with the end user 104 is stored in the sponsored module of the sponsored printer 210. While claiming for the credit from the sponsored service center 214, the credit information (Signature$_{AuthKey}$(Discount)) stored in the sponsored module is verified by the trusted service provider 106. In one embodiment, the cost of the printing of the sponsored document 216 is substantially subsidized upon successful verification of the credit information.

Figure 4:
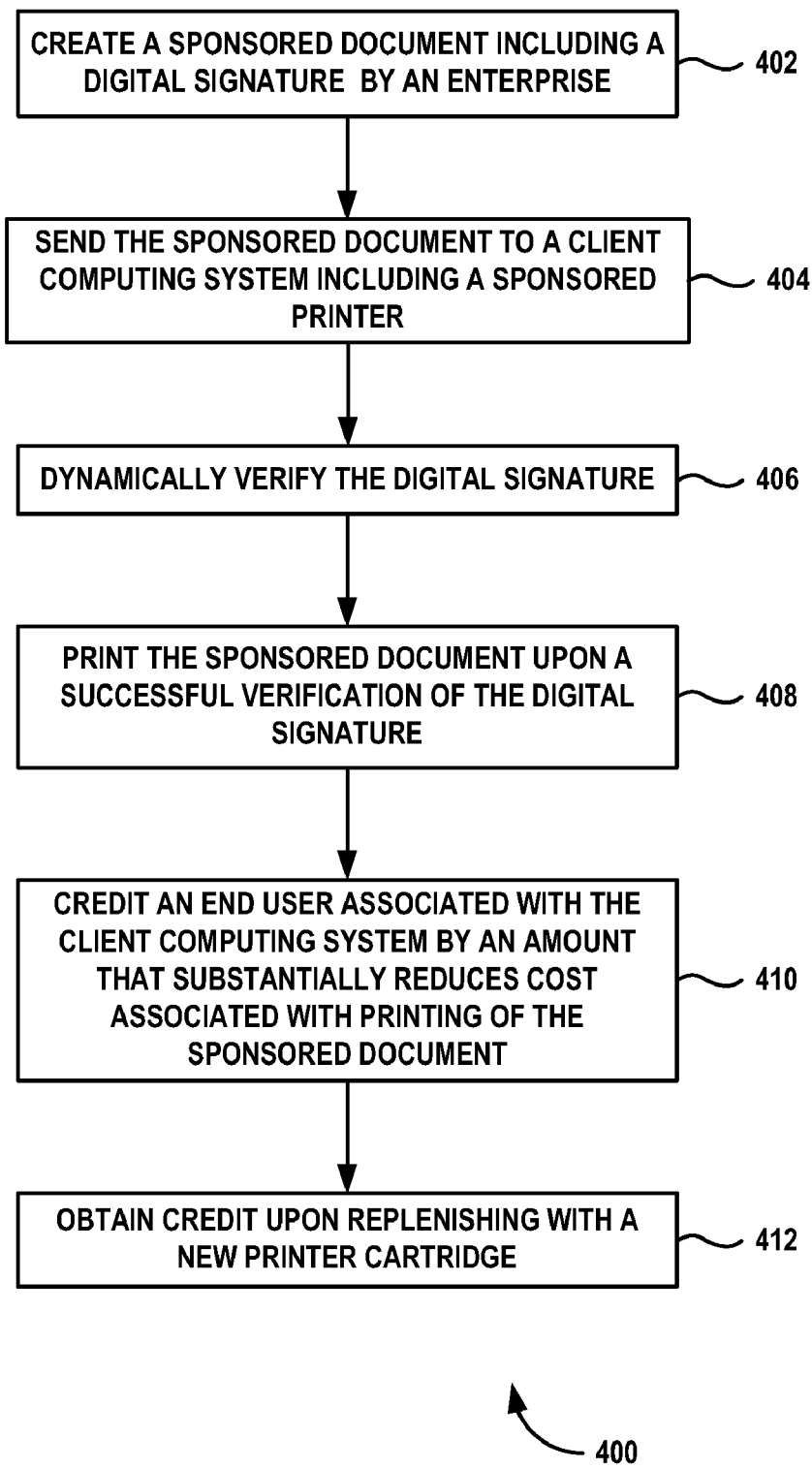
FIG. 4 illustrates a process flow of implementing the discounted printing, according to one embodiment.

FIG. 4 illustrates a process flow 400 of implementing discounted printing, according to one embodiment. In operation 402, a sponsored document 216 including a digital signature 216A is created using a cryptographic protocol provided in an application by an enterprise 102. For example, the cryptographic protocol is an abstract security protocol that applies cryptographic methods for embedding digital signature 216A in the sponsored document 216. In some embodiments, the sponsored document 216 including the digital signature 216A is created by creating a hash of the sponsored document 216 including a header and encrypting the hash of the sponsored document 216 using a public key. For example, the public key may be a key of an encryption key pair used to encrypt and decrypt the digital signature 216A. In these embodiments, the header of the encrypted hashed sponsored document 216 includes metadata. For example, the metadata in the header includes enterprise sponsorship related information (e.g., information such as number of pages that can be printed by an end user 104, geographical areas where the sponsored document 216 can be printed, period of validity for printing, a printer identification number, etc.).

In operation 404, the sponsored document 216 including the digital signature 216A is sent to a client computing system 204 (e.g., having a sponsored printing software) including a sponsored printer 210 for printing by the enterprise 102. In one embodiment, the sponsored document 216 including the digital signature 216A may be sent to the client computing system 204 via an email, a social networking portal, a web portal, etc. In one exemplary implementation, the sponsored document 216 including the digital signature 216A is sent to the client computing system 204 in a format including a portable document format (PDF), a post script format, a printer control language (PCL) format and the like. One can envision that the enterprise 102 can send the sponsored document 216 including the digital signature 216A to the client computing system 204 in any other formats known in the art and is not limited to the formats discussed above.

In operation 406, the digital signature 216A associated with the sponsored document 216 is dynamically verified by a trusted service provider 106 upon the enterprise 102 sending the sponsored document 216 to the sponsored printer 210. In operation 408, the sponsored document 216 is printed by the sponsored printer 210 upon a successful verification of the digital signature 216A associated with the sponsored document 216.

In some embodiments, a token 218 including a printer identification number is sent to the sponsored printer 210 by the trusted service provider 106 and the sponsored document 216 is printed upon a successful verification of the token 218 by the sponsored printer 210. In these embodiments, the token 218 is sent by a trusted service provider server 208 associated with the trusted service provider 106 upon a successful decryption of the encrypted hashed sponsored document 216, i.e., upon the successful verification of the digital signature 216A of the sponsored document 216.

It is appreciated that the trusted service provider 106 stores end user information associated with the sponsored printer 210 in the trusted service provider server 208 upon each successful verification of the digital signature 216A associated with the sponsored document 216. In one exemplary implementation, statistical data (e.g., number of prints associated with the end user 104, time of print, etc.) is computed using the stored end user information and is sent to the enterprise 102.

In operation 410, the end user 104 associated with the sponsored printer 210 is credited by an amount that substantially subsidizes cost associated with the printing of the sponsored document 216. In some embodiments, credit information is stored in the sponsored printer 210 based on the digital signature 216A of the sponsored document 216 and based on the stored credit information, the end user 104 associated with the sponsored printer 210 is credited by an amount that substantially subsidizes the cost associated with the printing of the sponsored document 216. In one embodiment, an audit trail of crediting the end user 104 is created in the sponsored printer 210. For example, the audit trail can reside online, inside the sponsored printer 210 or in the sponsored module, residing in the printer cartridge. In one exemplary implementation, the audit trail is subsequently used for crediting the end user.

In operation 412, the credit is obtained upon replenishing the printer cartridge of the sponsored printer 210 with a new printer cartridge using the stored credit information. In one embodiment, the end user 104 may claim the credit upon completion of ink in the printer cartridge by returning the printer cartridge to a sponsored service center 214. In another embodiment, the trusted service provider 106 may allot points, based on number of times the token 218 was requested by the end user 104. Any discrepancy with actual number of documents printed is adjusted while replenishing the printer cartridge with a new cartridge. In yet another embodiment, the end users 104 may be provided with printers that will print only sponsored documents. For example, an insurance company may give printers to its agents for on demand printing of its brochures that will print only sponsored documents. In a further embodiment, the printer cartridge may be given free but an embedded software on the client computing system 204 may be programmed to trigger printing of promotional materials (e.g., advertisements, brochures, coupons, etc.) at defined intervals (e.g., one advertisement after every three prints).

Although, the process 400 describes many ways of crediting the end user 104 associated with the sponsored printer 210, one skilled in the art can envision that the end user 104 may be credited by several other ways known in the art.

Figure 5:
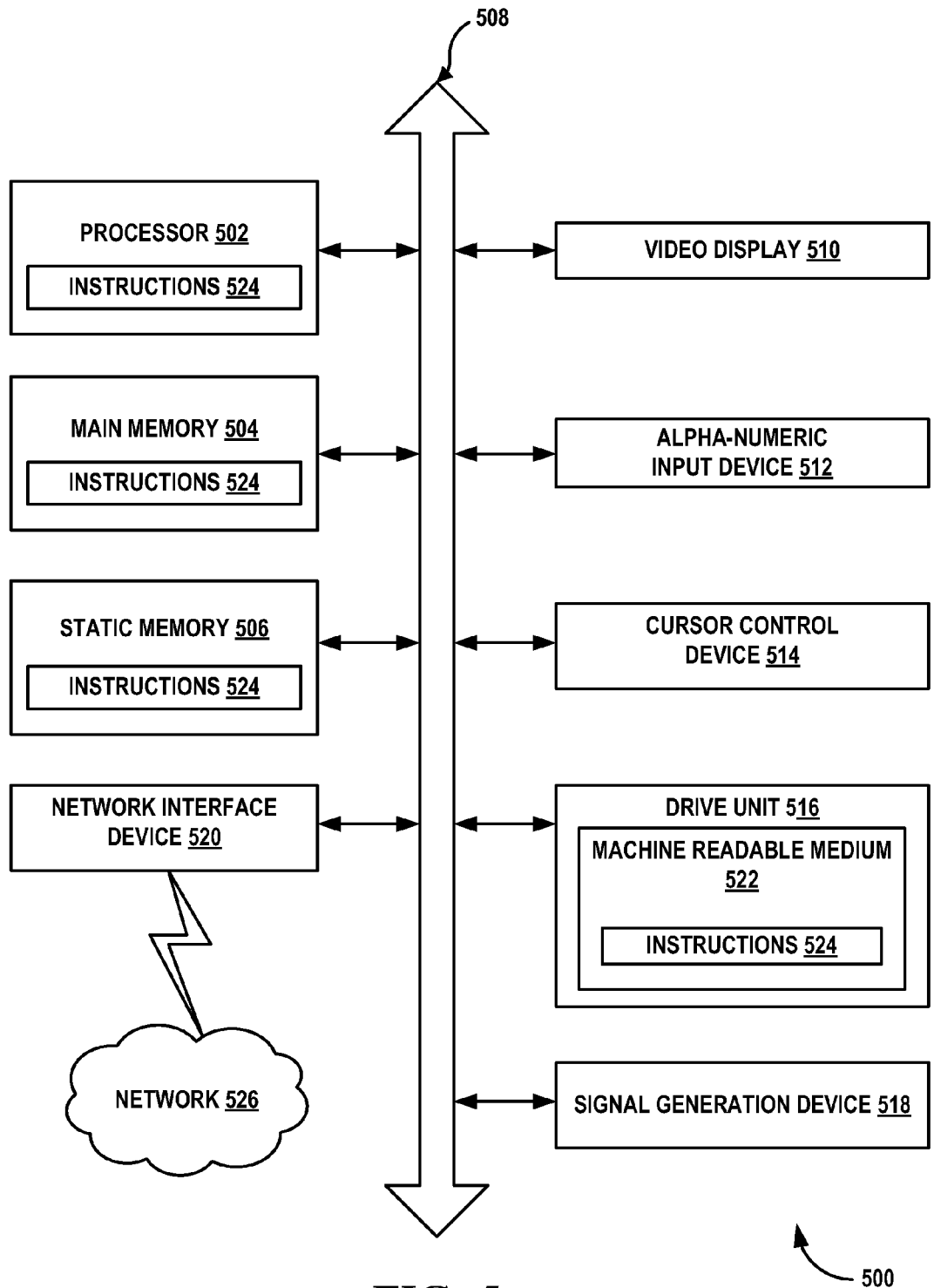
FIG. 5 illustrates a diagrammatic system view of a data processing system in which any of the embodiments disclosed herein may be performed, according to one embodiment.

FIG. 5 illustrates a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a BIOS and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

For example, a storage medium having instructions, that when executed by a computing platform, result in execution of the method of implementing a discounted printing including creating a sponsored document 216 including a digital signature 216A using a cryptographic protocol provided in an application by an enterprise 102, sending the sponsored document 216 including the digital signature 216A to a client computing system 204 including a sponsored printer 210 for printing by the enterprise 102, dynamically verifying the digital signature 216A by the trusted service provider 106 upon the enterprise 102 sending the sponsored document 216 to the sponsored printer 210, and printing the sponsored document 216 by the sponsored printer 210 upon a successful verification of the digital signature 216A.

The storage medium may have instructions to credit an end user 104 associated with the sponsored printer 210 by an amount that substantially subsidizes cost associated with the printing of the sponsored document 216. Further, the storage medium may have instructions to store end user information associated with the sponsored printer 210 in a trusted service provider server 208 by the trusted service provider 106 upon each successful verification of the digital signature 216A, compute statistical data from the stored end user information, and send the statistical data to the enterprise 102.

The above-described technique provides up to date printed marketing collaterals on demand. Further, the above-described sponsored based technique provides enterprises with ability to deliver direct-mail on a pull-based approach rather than the traditional push-based system. This gives the enterprises a higher targetability and actionability. The above-described technique ensures viewing of the delivered mail by the end users. Furthermore, the above-described technique gives enterprises ability to collect customer analytics, which can be of a high value in terms of targeted messaging. To the end users, the above-described technique provides the ability to transfer to the cost of printing to the enterprises, thus enabling lower or cost-free printing of preferred media.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for implementing discounted printing, comprising:
    creating a sponsored document including a digital signature using a cryptographic protocol provided in an application by an enterprise;
    sending the sponsored document including the digital signature to a client computing system including a sponsored printer for printing by the enterprise;
    sending, by the client computing system, the sponsored document including the digital signature to a trusted service provider for dynamically verifying the digital signature upon the enterprise sending the sponsored document to the client computing system; and
    printing the sponsored document by the sponsored printer upon a successful verification of the digital signature.

2. The method of claim 1, further comprising:
    crediting an end user associated with the sponsored printer by an amount that subsidizes cost associated with the printing of the sponsored document.

3. The method of claim 2, wherein the crediting the end user associated with the sponsored printer comprises:
    crediting the end user associated with the sponsored printer by the amount that subsidizes the cost associated with the printing of the sponsored document by storing credit information in the sponsored printer based on the digital signature.

4. The method of claim 1, further comprising:
    storing end user information associated with the sponsored printer in a trusted service provider server by the trusted service provider upon each successful verification of the digital signature;
    computing statistical data using the stored end user information; and
    sending the statistical data to the enterprise.

5. The method of claim 1, wherein creating the sponsored document including the digital signature comprises:
    creating a hash of the sponsored document; and
    encrypting the hash of the sponsored document using a public key.

6. The method of claim 5, wherein dynamically verifying the digital signature by the trusted service provider comprises:
    decrypting the encrypted hash of the sponsored document using the public key.

7. The method of claim 1, wherein printing the sponsored document by the sponsored printer upon the successful verification of the digital signature comprises:
    sending a token including a printer identification number to the client computing system by the trusted service provider;
    sending the sponsored document including the token to the sponsored printer by the client computing system;
    printing the sponsored document upon a successful verification of the token by the sponsored printer; and
    crediting an end user associated with the client computing system and creating an audit trail of crediting the end user in the sponsored printer.

8. The method of claim 7, wherein the sponsored printer is provided by the trusted service provider to the client computing system for verifying the token using cryptographic methods, wherein the token comprises enterprise sponsorship related information selected from the group consisting of number of pages that can be printed by the end user, geographical areas where the sponsored document can be printed, period of validity of sponsorship, and the printer identification number.

9. The method of claim 1, further comprising:
    signing up one or more enterprises for the discounted printing by the trusted service provider; and
    signing up multiple end users for availing the discounted printing by the trusted service provider, wherein each end user is associated with at least one client computing system.

10. An article, comprising:
    a storage medium having instructions, that when executed by a computing platform, result in execution of method of implementing discounted printing, comprising:

creating a sponsored document including a digital signature using a cryptographic protocol provided in an application by an enterprise;

sending the sponsored document including the digital signature to a client computing system including a sponsored printer for printing by the enterprise;

sending the sponsored document including the digital signature to a trusted service provider by the client computing system for dynamically verifying the digital signature by the trusted service provider upon the enterprise sending the sponsored document to the client computing system; and printing the sponsored document by the sponsored printer upon a successful verification of the digital signature.

11. The article of claim 10, further comprising:

crediting an end user associated with the sponsored printer by an amount that subsidizes cost associated with the printing of the sponsored document.

12. The article of claim 11, further comprising:

storing end user information associated with the sponsored printer in a trusted service provider server by the trusted service provider upon each successful verification of the digital signature;

computing statistical data from the stored end user information; and sending the statistical data to the enterprise.

13. A discounted printing system, comprising:

an enterprise portal associated with one or more enterprises;

a trusted service provider server associated with a trusted service provider and coupled to the enterprise portal; and a client computing system associated with an end user, wherein the client computing system includes a computer and a sponsored printer and wherein the sponsored printer includes a printer cartridge and a sponsored module residing in the printer cartridge, wherein the enterprise portal creates a sponsored document including a digital signature using a cryptographic protocol provided in an application residing in the enterprise portal, wherein the application is provided by the trusted service provider server, wherein the enterprise portal sends the sponsored document including the digital signature to the client computing system, wherein the client computing system sends the sponsored document including the digital signature to the trusted service provider server for dynamically verifying the digital signature, wherein the sponsored printer prints the sponsored document upon a successful verification of the digital signature by the trusted service provider server, and wherein the sponsored module stores credit information associated with the printing of the sponsored document that discounts the cost of the printer cartridge while replenishing with a new cartridge.

14. The discounted printing system of claim 13, wherein the trusted service provider server stores end user information associated with the sponsored printer upon the successful verification of the digital signature, wherein the trusted service provider server computes statistical data using the stored end user information, and wherein the trusted service provider sends the statistical data to the one or more enterprises.

15. The discounted printing system of claim 13, wherein the enterprise portal creating the sponsored document including the digital signature comprises creating a hash of the sponsored document and then encrypting the hash of the sponsored document using a public key provided by the trusted service provider server.

16. The discounted printing system of claim 15, wherein the enterprise portal includes a header in the hashed sponsored document and wherein the header includes metadata associated with the sponsored document which includes enterprise sponsorship related information including a printer identification number associated with the sponsored printer which is used by the sponsored printer to verify and print the sponsored document.

17. The discounted printing system of claim 13, wherein the enterprise portal sends the sponsored document including the digital signature to the client computing system including the sponsored printer via a distributing mechanism selected from the group consisting of an email, a social networking portal, and a web portal.

* * * * *